(12) United States Patent
Sugihara et al.

(10) Patent No.: US 11,897,363 B2
(45) Date of Patent: Feb. 13, 2024

(54) VEHICLE DRIVING SYSTEM AND VEHICLE

(71) Applicant: PRIME PLANET ENERGY & SOLUTIONS, INC., Tokyo (JP)

(72) Inventors: Atsushi Sugihara, Toyota (JP); Shizuka Masuoka, Nagoya (JP); Kodai Nagano, Nagoya (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 125 days.

(21) Appl. No.: 17/542,606

(22) Filed: Dec. 6, 2021

(65) Prior Publication Data

US 2022/0176847 A1    Jun. 9, 2022

(30) Foreign Application Priority Data

Dec. 8, 2020   (JP) ................. 2020-203620

(51) Int. Cl.

| | |
|---|---|
| *H02J 7/00* | (2006.01) |
| *B60L 58/12* | (2019.01) |
| *B60L 58/18* | (2019.01) |
| *H02J 7/14* | (2006.01) |
| *H02J 7/34* | (2006.01) |
| *B60L 58/13* | (2019.01) |
| *B60K 6/26* | (2007.10) |

(52) U.S. Cl.
CPC ............. *B60L 58/12* (2019.02); *B60L 58/13* (2019.02); *B60L 58/18* (2019.02); *H02J 7/0048* (2020.01); *H02J 7/1423* (2013.01); *H02J 7/342* (2020.01); *B60K 6/26* (2013.01)

(58) Field of Classification Search
CPC .......... B60L 58/12; B60L 58/18; B60L 58/13; H02J 7/1423; H02J 7/342; H02J 7/0048; B60K 6/26
USPC .................... 320/103, 109; 701/22
See application file for complete search history.

(56) References Cited

U.S. PATENT DOCUMENTS

| | | |
|---|---|---|
| 9,037,334 B1 | 5/2015 | Cole |
| 2005/0266299 A1 | 12/2005 | Nishiyama et al. |
| 2007/0256872 A1 | 11/2007 | Yamamuro et al. |
| 2011/0221400 A1 | 9/2011 | Takizawa et al. |
| 2013/0187576 A1 | 7/2013 | Oikawa et al. |
| 2014/0203633 A1 | 7/2014 | Nishi |
| 2014/0216842 A1 | 8/2014 | Hayashi et al. |

(Continued)

FOREIGN PATENT DOCUMENTS

| | | |
|---|---|---|
| CN | 103518303 A | 1/2014 |
| CN | 103733421 A | 4/2014 |

(Continued)

*Primary Examiner* — Zixuan Zhou
(74) *Attorney, Agent, or Firm* — Finnegan, Henderson, Farabow, Garrett & Dunner, LLP

(57) ABSTRACT

A vehicle driving system includes a drive motor-generator connected to a first battery and a second battery via respective relays, a power receiving unit connected to the first battery and the second battery via respective relays and connected to an external power supply, and a controller. The controller is configured to, when the power receiving unit is connected to the external power supply, cause the first battery to be charged if the state of charge of the first battery is lower than a predetermined SOC and cause the second battery to be charged if the state of charge of the first battery is higher than or equal to the predetermined SOC.

19 Claims, 1 Drawing Sheet

(56) References Cited

U.S. PATENT DOCUMENTS

| | | | |
|---|---|---|---|
| 2015/0298568 A1* | 10/2015 | Mitsutani | B60W 10/26 180/65.21 |
| 2016/0172653 A1* | 6/2016 | Henderson | H01M 50/519 429/7 |
| 2016/0347161 A1 | 12/2016 | Kusumi et al. | |
| 2017/0187316 A1 | 6/2017 | Kobayashi | |
| 2017/0264108 A1 | 9/2017 | Ito et al. | |
| 2019/0210474 A1 | 7/2019 | Otsuki et al. | |
| 2019/0226859 A1 | 7/2019 | Li et al. | |
| 2019/0299806 A1 | 10/2019 | Oyama et al. | |
| 2019/0366830 A1 | 12/2019 | Cafeo et al. | |

FOREIGN PATENT DOCUMENTS

| | | |
|---|---|---|
| CN | 104249626 A | 12/2014 |
| CN | 110065414 A | 7/2019 |
| CN | 110549905 A | 12/2019 |
| DE | 10 2016 207 578 A1 | 11/2017 |
| EP | 2821274 A2 | 1/2015 |
| JP | 2004-171864 A | 6/2004 |
| JP | 2005-160125 A | 6/2005 |
| JP | 2005-293977 A | 10/2005 |
| JP | 2005-297937 A | 10/2005 |
| JP | 2010-123503 A | 6/2010 |
| JP | 2012-234697 A | 11/2012 |
| JP | 2012-239382 A | 12/2012 |
| JP | 2013-059161 A | 3/2013 |
| JP | 5321742 B1 | 7/2013 |
| JP | 2014-155377 A | 8/2014 |
| JP | 2015-217859 A | 12/2015 |
| JP | 2016-215947 A | 12/2016 |
| JP | 2017-118775 A | 6/2017 |
| JP | 2017-163652 A | 9/2017 |
| JP | 2019-180111 A | 10/2019 |
| KR | 10 2012-0061642 A | 6/2012 |
| WO | WO 2006-019030 A | 2/2006 |
| WO | WO 2012-046271 A1 | 4/2012 |
| WO | WO 2012/146962 A2 | 11/2012 |
| WO | WO 2014/060812 A2 | 4/2014 |
| WO | WO 2016-147295 A | 9/2016 |

* cited by examiner

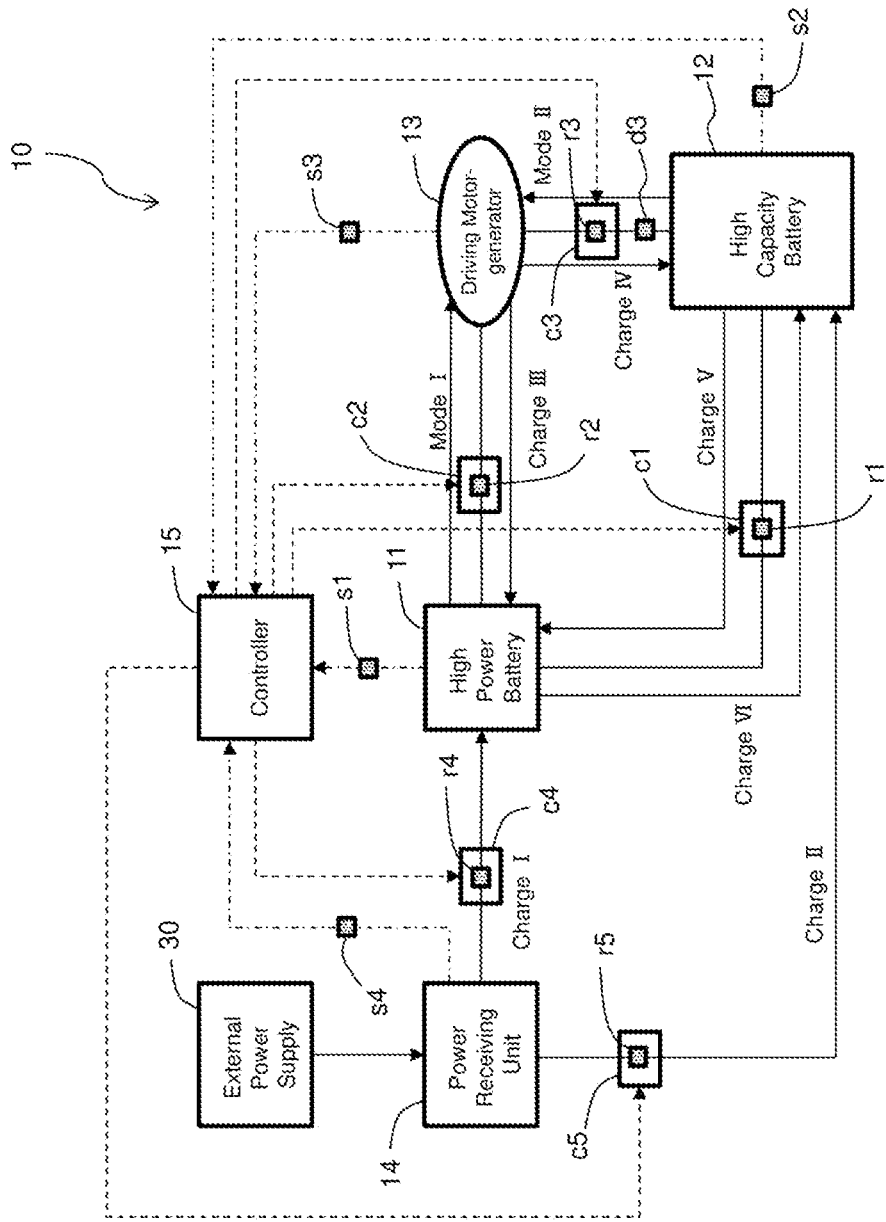

VEHICLE DRIVING SYSTEM AND VEHICLE

CROSS REFERENCE TO RELATED APPLICATIONS

The present application claims priority from Japanese Patent Application No. 2020-203620 filed on Dec. 8, 2020, which is incorporated by reference herein in its entirety.

TECHNICAL FIELD

The present invention relates to a vehicle driving system and a vehicle.

BACKGROUND

JP 2012-234697 A discloses a battery system. The battery system disclosed in the publication includes: a first battery pack and a second battery pack, which are charged and discharged; and a diode. The first battery pack is capable of being charged and discharged with a higher current than is the second battery pack. The second battery pack has a higher storage capacity than the first battery pack. The first battery pack and the second battery pack are connected in parallel to each other and also connected to a load. The diode is connected in series to the second battery pack and is also connected in parallel to the first battery pack as well as the second battery pack. The diode permits a discharge current from the second battery pack to the load, but prevents excessive current from flowing from the load to the second battery pack. A charger may be connected to the second battery pack. The charger may input electric power from an external power supply into the second battery pack.

In this battery system, the diode is provided so that the second battery pack is permitted to perform only discharging to the load. When the state of charge (SOC) of the second battery pack is lowered by discharge, the second battery pack may be charged by using a charger. Because the first battery pack and the second battery pack are connected in parallel, the charge current in charging the second battery pack is allowed to flow from the second battery pack to the first battery pack so that the first battery pack can also be charged. This configuration makes it possible to prevent an excessive current from flowing into the second battery pack. It is also reported that the electric energy stored in the second battery pack can be utilized efficiently.

SUMMARY

The present inventors intend batteries to function more efficiently for a vehicle fitted with a high power type battery and a high capacity type battery.

A vehicle driving system according to the present disclosure includes a first battery, a second battery, a driving motor-generator, a power receiving unit, and a controller. The driving motor-generator is connected to the first battery and the second battery via respective relays. The power receiving unit is connected to the first battery and the second battery via respective relays, and is also connected to an external power supply. The first battery is configured to be permitted to be charged and discharged at a current rate of higher than or equal to 5 C. The second battery has a higher capacity than the first battery. The controller is configured to, when the power receiving unit is connected to the external power supply, cause the first battery to be charged if the state of charge of the first battery is lower than a predetermined SOC and cause the second battery to be charged if the state of charge of the first battery is higher than or equal to the predetermined SOC.

The just-described vehicle driving system allows the first battery, which is a high power battery, to be charged preferentially. This enables the batteries to achieve a state in which the drive motor-generator can be driven at high power appropriately as required, so that the batteries can function efficiently.

The controller may be configured to control a charging current value to be higher when the first battery is charged from the power receiving unit than when the second battery is charged from the power receiving unit.

The controller may also be configured to, when regenerative power is output from the drive motor-generator, cause the regenerative power to be input to the first battery if the state of charge of the first battery is lower than a predetermined SOC and cause the regenerative power to be input to the second battery if the state of charge of the first battery is higher than or equal to the predetermined SOC.

The controller may also be configured to cause the drive motor-generator to be connected to the first battery when the output power value required by the drive motor-generator is higher than or equal to a predetermined output power value and the state of charge of the first battery is higher than or equal to a predetermined SOC. The controller may further be configured to cause the drive motor-generator to be connected to the second battery when the output power value required by the drive motor-generator is higher than or equal to the predetermined output power value and the state of charge of the first battery is lower than the predetermined SOC.

The controller may also be configured to cause the drive motor-generator to be connected to the second battery when the output power value required by the drive motor-generator is lower than a predetermined output power value and the state of charge of the second battery is higher than or equal to a predetermined SOC. The controller may further be configured to cause the drive motor-generator to be connected to the first battery when the output power value required by the drive motor-generator is lower than the predetermined output power value and the state of charge of the second battery is lower than the predetermined SOC.

The controller may be configured to cause the first battery to be charged from the second battery when both the first battery and the second battery are disconnected from the drive motor-generator and the state of charge of the first battery is lower than a predetermined SOC.

The controller may be configured to cause the second battery to be charged from the first battery when both the first battery and the second battery are disconnected from the drive motor-generator and the state of charge of the first battery is higher than the predetermined SOC.

The first battery may be lighter in weight and smaller in size than the second battery. Embodiments of the vehicle driving system as disclosed herein may be incorporated in a vehicle as appropriate.

BRIEF DESCRIPTION OF THE DRAWINGS

FIG. 1 is a schematic view illustrating a vehicle driving system 10 according to the present disclosure.

DETAILED DESCRIPTION

Hereinbelow, embodiments of a vehicle driving system are described according to the present disclosure. It should be noted, however, that the disclosed embodiments are, of course, not intended to limit the invention. The present invention is not limited to the embodiments described herein unless specifically stated otherwise. The drawings are depicted schematically and do not necessarily reflect actual objects. The features and components that exhibit the same effects are designated by the same reference symbols as appropriate, and the description thereof will not be repeated.

Vehicle Driving System 10

FIG. 1 is a schematic view illustrating a vehicle driving system 10 according to the present disclosure. The vehicle driving system 10 includes a first battery 11, a second battery 12, a drive motor-generator 13, a power receiving unit 14, and a controller 15. The vehicle driving system 10 may be connected to an external power supply 30 outside the system so as to be charged. The vehicles to which such a vehicle driving system 10 is applicable include not only electric cars but also small-sized vehicles, such as electric scooters and electric motorcycles.

First Battery 11 and Second Battery 12

The first battery 11 is configured to be permitted to be charged and discharged at a current rate of higher than or equal to 5 C which is higher than the current rate permitted by the second battery 12. The second battery 12 has a higher capacity than the first battery 11. In other words, the first battery 11 is capable of being charged and discharged at higher currents, and is composed of what is called a high power type battery. On the other hand, the second battery 12 is composed of what is called a high capacity type battery. The first battery 11 may be referred to herein as a "high power battery", where appropriate. The second battery 12 may be referred to herein as a "high capacity battery", where appropriate.

More specifically, both the first battery 11 and the second battery 12 are provided with the output power performance that is required for a power supply used for driving the driving motor-generator 13 to propel vehicles. It should be noted that the first battery 11 may be designed to permit charging and discharging at a considerably higher current than the second battery 12. The second battery 12 may be designed to have a considerably higher capacity than the first battery 11. That is, the first battery 11 has, in addition to the function as an electric power source for driving the vehicle, a structure that is more resistant against deterioration when charged and discharged at high currents in relative comparison to the second battery 12. In this embodiment, the first battery 11 provides superior performance in terms of high rate performance. On the other hand, the second battery 12 has, in addition to the function as an electric power source for driving the vehicle, a higher capacity in relative comparison to the first battery 11.

It should be noted that the second battery 12 may have high output power performance equivalent to that of the first battery 11. Alternatively, although the second battery 12 may have a higher capacity than the first battery 11, the second battery 12 may have lower output power performance than that of the first battery 11. The first battery 11 may be composed of a battery pack, where appropriate. The second battery 12 may be a single cell battery, or may be composed of a battery pack, where appropriate. For large-sized vehicles, which require higher load during travel, the first battery 11 and the second battery 12 may preferably include battery packs. For small-sized vehicles, in which the required load during travel is low, the first battery 11 may be a single cell battery, and the second battery 12 may likewise be a single cell battery.

For the first battery 11, it is possible to adopt, for example, a battery that is used as an electric power source for driving hybrid electric vehicles. Hybrid electric vehicles are equipped with an internal combustion engine so that they can generate electric power from the mechanical power obtained by the internal combustion engine. For this reason, for the batteries for use as the electric power sources for driving hybrid electric vehicles, it is not considered so important to achieve high capacity. On the other hand, in order to improve fuel economy of hybrid electric vehicles, it is desired to recover the regenerative energy generated by the drive motor-generator 13 during braking as much as possible The regenerative energy is produced according to the kinetic energy during braking. This means that a large amount of energy may be produced instantaneously. From the viewpoint of recovering the regenerative energy as much as possible, it is desirable that the batteries for use as electric power sources for driving hybrid electric vehicles have a structure that is resistant against deterioration when charged and discharged at high currents.

Thus, the batteries used as electric power sources for driving hybrid electric vehicles seek to achieve higher performance in efficiently recovering the regenerative energy converted into electric power, rather than increasing their capacity. Typical examples of the materials used for the lithium-ion secondary batteries for use as electric power sources for driving hybrid electric vehicles include what is called an NMC three-component lithium-containing transition metal composite oxide, which contains nickel manganese cobalt, for the positive electrode active material, graphite for the negative electrode active material, and ethylene carbonate or ethyl methyl carbonate for the electrolyte solution. The lithium-ion secondary batteries for use as electric power sources for driving hybrid electric vehicles adopt various design ideas in, for example, the structure of the active material layer, the viscosity and composition of the electrolyte solution, and addition agents to the electrolyte solution. For example, prismatic batteries incorporated in hybrid electric vehicles may achieve a charge-discharge current of about 30 C while preventing the deterioration of the secondary batteries. The batteries that are applicable to the first battery 11 are not limited to the examples described herein. As the research advances further in the future, it is expected that electric power sources for driving hybrid electric vehicles will evolve further to achieve charging at further higher currents. That is, the first battery 11 may adopt a battery having a structure that is particularly resistant against deterioration when charged and discharged at high currents.

For the second battery 12, it is possible to adopt, for example, a high capacity battery for a battery electric vehicle (BEV), in which a battery power source is used to power a drive motor to propel the vehicle. Examples of the materials used for such a high capacity battery include lithium cobalt oxide for the positive electrode active material, graphite for the negative electrode active material, and a gelled electrolyte in which a polymer composed of polyethylene oxide or polyvinylidene fluoride is impregnated with an electrolyte solution for the electrolyte. Such a configuration may be able to achieve an energy density of about 200 Whig to about 300 Wh/g. It also permits charging and discharging at a current rate of about 1 C to 3 C. Such a secondary battery tends not to permit charging and discharging at a relatively high current rate, such as higher than 5 C, or at a current value of higher than 10 A, in which case battery degradation proceeds more quickly. Also, the charging speed may be controlled to be slower around the time after the capacity has reached 80%. Thus, the second battery 12 may have a higher capacity than the first battery 11 in order to increase the traveling distance range of the vehicle. On the other hand, the second battery 12 may have a tendency to deteriorate more easily than the first battery 11 when charged and discharged at high currents. For this reason, the second battery 12 may be used together with a mechanism that limits the current when charged and discharged.

In this embodiment, the first battery 11 and the second battery 12 are connected to each other via a relay r1. In addition, the first battery 11 is provided with a sensor s1 for detecting voltage values and current values. The second battery 12 is provided with a sensor s2 for detecting voltage values and current values. The sensor s1 and the sensor s2 are each connected to the controller 15 so that the detection signals of the sensor s1 and the sensor s1 are each sent to the controller 15. The sensor s1 may be further provided with the function of detecting the temperature of the first battery 11. The sensor s2 may be further provided with the function of detecting the temperature of the second battery 12.

Drive Motor-Generator 13

The drive motor-generator 13 is a device that provides the functions of drive motor and generator. The drive motor-generator 13 is configured to receive electric power and generate kinetic energy used for propelling the vehicle. The drive motor-generator 13 is also configured to convert the kinetic energy produced during braking of the vehicle into electric energy. The motor-generator 13 is a device that converts kinetic energy into electric energy when the vehicle is decelerated or stopped.

In this embodiment, the drive motor-generator 13 and the first battery 13 are electrically connected to each other via a relay r2. The relay r2 is built into a control unit c1. In this embodiment, the drive motor-generator 13 and the second battery 12 are electrically connected to each other via a relay r3. The relay r3 is built into a control unit c2. For the drive motor-generator 13 described above, various types of motors for electric vehicles are proposed. As the research advances further in the future, it is expected that motor-generators will evolve further to enable the drive motor-generator 13 to output power more efficiently. Accordingly, the drive motor-generator 13 is not limited to any currently known motor-generator. In addition, the drive motor-generator 13 in this embodiment is provided with a sensor s3 for detecting that regenerative power has been generated. The sensor s3 may be configured to detect the amount of regenerative power.

Power Receiving Unit 14

The power receiving unit 14 receives electric power from the external power supply 30. The external power supply 30 may be a domestic electric power supply or an electric power supply installed at a charging station in town. The power receiving unit 14 is a device that is configured to be electrically connected to the external power supply 30 via either wired or wireless (contactless) connection. In this embodiment, the power receiving unit 14 is provided with a sensor s4 for detecting connection to the external power supply 30. The sensor s4 may be configured to detect wired connection or wireless electrical connection between the power receiving unit 14 and the external power supply 30. The detection signal of the sensor s4 is sent to the controller 15. The power receiving unit 14 and the first battery 11 are electrically connected to each other via a relay r4. The power receiving unit 14 and the second battery 12 are electrically connected to each other via a relay r5. Although the detailed structure of the sensor s4 is not specifically disclosed herein, it is possible to adopt a mechanical detecting means or an electrical detecting means as appropriate. Such a detecting means may be adopted as appropriate by those skilled in the art.

Relays r1 to r5

Each of the relays r1 to r5 may be implemented as a semiconductor relay that is controlled by the controller 15. In this embodiment, the relays r1 to r5 are built into respective control units c1 to c5. Each of the relays 11 to r5 is turned ON and OFF by the controller 15. Each of the control units c1 to c5 includes an inverter, a DC-DC converter, and the like as appropriate. For example, the relay r1 connects the first battery 11 and the second battery 12 to each other. In this case, the control unit c1 controls the turning ON and OFF of the relay r1 and also controls the voltage appropriately by the DC-DC converter incorporated in the control unit c1. Thus, the control unit c1 controls charging between the first battery 11 and the second battery 12.

In addition, the relay r2 connects the first battery 11 and the drive motor-generator 13 to each other. The relay r3 connects the second battery 12 and the drive motor-generator 13 to each other. Direct current is input to and output from the secondary batteries, including the first battery 11 and the second battery 12. On the other hand, alternating current is input to and output from the drive motor-generator 13. The control units c2 and c3 convert direct current into alternating current when a voltage is applied from the first battery 11 and the second battery 12 to the drive motor-generator 13. This conversion is performed by inverters incorporated in the control units c2 and c3. In addition, when the output voltage from the first battery 11 and the second battery 12 is lower than the control voltage of the drive motor-generator 13, the voltage is stepped up by the DC-DC converters incorporated in the control units c2 and c3.

The relay r4 connects the first battery 11 and the power receiving unit 14 to each other. The relay r5 connects the second battery 12 and the power receiving unit 14 to each other. The power receiving unit 14 is connected to the external power supply 30. The voltage of the relay r4 is controlled appropriately according to the input-output power performance of the first battery 11. The voltage of the relay r5 is controlled appropriately according to the input-output power performance of the second battery 12. It is also possible that the charging current from the external power supply 30 to the first battery 11 may be controlled by the control unit c4 incorporating the relay r4 or by the power receiving unit 14. It is also possible that the charging current from the external power supply 30 to the second battery 12 may be controlled by the control unit c5 incorporating the relay r5 or by the power receiving unit 14. In order to implement such control operations, the control units c4 and c5 and the power receiving unit 14 may each include an inverter, a DC-DC converter, and the like, as appropriate.

In FIG. 1, charging from the power receiving unit 14 to the first battery 11 is designated as "Charge I". Charging from the power receiving unit 14 to the second battery 12 is designated as "Charge II". Charging from the drive motor-generator 13 to the first battery 11 is designated as "Charge III". Charging from the drive motor-generator 13 to the second battery 12 is designated as "Charge IV". Charging from the second battery 12 to the first battery 11 is designated as "Charge V". Charging from the first battery 11 to the second battery 12 is designated as "Charge VI". In addition, supplying of electric power from the first battery 11 to the drive motor-generator 13 is designated as "Mode I". Supplying of electric power from the second battery 12 to the drive motor-generator 13 is designated as "Mode II".

Controller 15

The controller 15 is configured to, when the power receiving unit 14 is connected to the external power supply 30, cause the first battery 11 to be charged if the state of charge of the first battery 11 is lower than a predetermined SOC and cause the second battery 12 to be charged if the state of charge of the first battery 11 is higher than or equal to the predetermined SOC. In the configuration described above, the charging from the power receiving unit 14 to the first battery 11, designated as "Charge I", takes precedence over the charging from the power receiving unit 14 to the second battery 12, designated as "Charge II".

In this embodiment, whether or not the power receiving unit 14 has been connected to the external power supply 30 is determined based on a detection signal from the sensor s4, which is provided for the power receiving unit 14. Whether or not the state of charge of the first battery 11 is lower than the predetermined SOC is determined based on a detection signal from the sensor s1, which is provided for the first battery 11. For example, the sensor s1 detects information such as the voltage value, the current value, and the temperature of the first battery 11. The controller 15 may be configured to obtain the state of charge (SOC) of the first battery 11 based on the detected data, such as the voltage value, the current value, and the temperature of the first battery 11, which are obtained from the sensor s1. As for the technique for estimating the SOC of the first battery 11, various techniques have been proposed to estimate the SOC of a secondary battery, so any appropriate technique may be adopted for the first battery 11. When it is determined that the power receiving unit 14 has been connected to the external power supply 30 based on the detection signal from the sensor s4 and if the state of charge of the first battery 11 is lower than a predetermined SOC, the controller 15 controls charging so that the first battery 11 is charged from the power receiving unit 14.

In this case, in the embodiment shown in FIG. 1, the controller 15 may cause the relay r4 to be turned ON and cause the relay r5, the relay r1, and relay r2 to be turned OFF. This allows the first battery 11 to be connected to the power receiving unit 14 connected to the external power supply 30, and as a result, the first battery 11 is charged through the power receiving unit 14. On the other hand, when the power receiving unit 14 has been connected to the external power supply 30 and if the state of charge of the first battery 11 is higher than or equal to the predetermined SOC, the controller 15 is configured to cause the second battery 12, the high capacity battery, to be charged. In this case, in the embodiment shown in FIG. 1, the controller 15 may cause the relay r5 to be turned ON and cause the relay r4, the relay r1, and the relay r3 to be turned OFF.

Such a control allows the first battery 11, which is a high power battery, to be charged preferentially when the power receiving unit 14 has been connected to the external power supply 30 and if the state of charge of the first battery 11 is lower than a predetermined SOC. This ensures that, after the first battery 11 and the second battery 12 have been charged by the external power supply 30, the high power battery can be used preferentially. Also, this enables the high power battery to supply electric power to the drive motor-generator 13 so that the drive motor-generator 13 can be driven at high power swiftly when required. As a result, the first battery 11 and the second battery 12 are able to function efficiently.

In the above-described control operation, the predetermined SOC of the first battery 11 may be set to 100% SOC, which is the upper limit SOC within the use range that can be set for the first battery 11. Alternatively, after charging, some extra charge level may be left in order to prevent deterioration of the first battery 11 or in order to accept regenerative energy. From such a viewpoint, the predetermined SOC of the first battery 11 may be set to about 80% SOC in the above-described control. Thus, in the above-described control operation, the predetermined SOC of the first battery 11 may be set to an appropriate SOC within the range of from 100% SOC, which is the upper limit SOC within the use range that can be set for the first battery 11, to about 70% SOC. For the second battery 12 as well, the state of charge (SOC) may be estimated by a predetermined process performed by the controller 15 based on the information detected by the sensor s2.

It is also possible that the controller 15 may be configured to cause a current value to be higher when the first battery 11 is charged from the power receiving unit 14 than when the second battery 12 is charged from the power receiving unit 14. For example, the controller 15 may be configured to control the control unit c4 to cause a voltage applied from the power receiving unit 14 to the first battery 11 to be higher when the first battery 11 is charged from the power receiving unit 14. This increases the current value when charging the first battery 11. Thus, the first battery 11 is charged rapidly. As a result, for example, even when both the first battery 11 and the second battery 12 run out of charge, the vehicle driving system 10 can be quickly recovered to the state of charge at which the vehicle driving system 10 is usable for short distances, because rapid charging is possible for the first battery 11.

The controller 15 is configured to cause the first battery 11 to be charged preferentially when regenerative power is output from the drive motor-generator 13. More specifically, the controller 15 may be configured to, when regenerative power is output from the driving motor-generator 13, cause the regenerative power to be input to the first battery 11 if the state of charge of the first battery 11 is lower than a predetermined SOC and cause the regenerative power to be input to the second battery 12 if the state of charge of the first battery 11 is higher than or equal to the predetermined SOC. In the configuration described above, when the drive motor-generator 13 produces regenerative power, the charging from the drive motor-generator 13 to the first battery 11, designated as "Charge III", takes precedence over the charging from the drive motor-generator 13 to the second battery 12, designated as "Charge IV".

The regenerative power produced by the drive motor-generator 13 is produced from the kinetic energy obtained when braking the vehicle, so high electric power can be produced instantaneously. For this, the first battery 11 can permit a higher charging current than the second battery 12. Thus, because the controller 15 is configured to cause the first battery 11 to be preferentially charged when regenerative power is output from the drive motor-generator 13, a larger amount of the regenerative power produced by the drive motor-generator 13 can be recovered. The electric power recovered by this operation is utilized for driving the vehicle. As a result, the traveling distance range of the vehicle can be increased.

Herein, in the embodiment shown in FIG. 1, when regenerative power is input from the drive motor-generator 13 to the first battery 11, the controller 15 may cause the relay r2 to be turned ON and cause the relay r1, the relay r3, and the relay r4 to be turned OFF. This enables the drive motor-generator 13 to be connected to the first battery 11. Accordingly, the regenerative power produced by the drive motor-generator 13 charges the first battery 11. In this case, the voltage value and the current value may be controlled appropriately by the control unit c2.

On the other hand, when regenerative power is input from the drive motor-generator 13 to the second battery 12, the controller 15 may cause the relay r3 to be turned ON and cause the relay r1, the relay r2, and the relay r5 to be turned OFF. This enables the drive motor-generator 13 to be connected to the second battery 12. Accordingly, the regenerative power produced by the drive motor-generator 13 charges the second battery 12. In this case, the voltage value and the current value may be controlled appropriately by the control unit c3.

For example, the upper limit current value that is permitted by the second battery 12 is lower than that of the first battery 11. The current value may be controlled from this viewpoint. In addition, as illustrated in FIG. 1, a constant-current diode d3 may be provided in a current path between the drive motor-generator 13 and the second battery 12. The constant-current diode d3 may be configured to limit the current directed from the drive motor-generator 13 to the second battery 12 to be lower than or equal to a certain level.

The controller 15 may be configured to cause the drive motor-generator 13 to be connected to the first battery 11 when the output power value required by the drive motor-generator 13 is higher than or equal to a predetermined output power value and the state of charge of the first battery 11 is higher than or equal to a predetermined SOC. Furthermore, the controller 15 may be configured to cause the drive motor-generator 13 to be connected to the second battery 12 when the output power value required by the drive motor-generator 13 is higher than or equal to the predetermined output power value and the state of charge of the first battery 11 is lower than the predetermined SOC.

In the configuration described above, when the output power value required by the drive motor-generator 13 is high, i.e., when the load is high, electric power is supplied preferentially from the first battery 11, which is a high power battery, to the drive motor-generator 13. In other words, supplying of electric power from the first battery 11 to the drive motor-generator 13, "Mode I", takes precedence when the output power value required by the drive motor-generator 13 is high. Such a control operation may be applied when the vehicle needs to quickly accelerate or climb a hill, for example. The first battery 11 has a high output power tolerance and is therefore able to output a high current in response to the requirement from the drive motor-generator 13. On the other hand, the first battery 11 has a lower capacity than the second battery 12. In this embodiment, the controller 15 is configured to cause the drive motor-generator 13 to be connected to the second battery 12 when the output power value required by the drive motor-generator 13 is higher than or equal to a predetermined output power value and the state of charge of the first battery 11 is lower than a predetermined SOC.

Therefore, even if the output power value does not quite reach the level required by the drive motor-generator 13, the electric power supply to the drive motor-generator 13 does not stop, and the vehicle is able to continue to run. Moreover, the SOC of the first battery 11 is prevented from lowering beyond a predetermined SOC. This serves to prevent deterioration of the first battery 11. In addition, because the regenerative power from the drive motor-generator 13 is supplied preferentially to the first battery 11 as described above, it is possible to quickly recover the SOC of the first battery 11 and improve the utilization rate of the first battery 11.

The controller 15 may be configured to cause the drive motor-generator 13 to be connected to the second battery 12 when the output power value required by the drive motor-generator 13 is lower than a predetermined output power value and the state of charge of the second battery 12 is higher than or equal to a predetermined SOC. Furthermore, the controller 15 may be configured to cause the drive motor-generator 13 to be connected to the first battery 11 when the output power value required by the drive motor-generator 13 is lower than the predetermined output power value and the state of charge of the first battery 11 is lower than the predetermined SOC. In other words, electric power supply "Mode II", in which electric power is supplied from the second battery 12 to the drive motor-generator 13, takes precedence when the output power value required by the drive motor-generator 13 is low.

In the configuration described above, when the output power value required by the drive motor-generator 13 is low, i.e., when the load is low, electric power is supplied preferentially from the second battery 12, which is a high capacity battery, to the drive motor-generator 13. Such a control operation may be applied when the vehicle needs to run at a slow and constant speed. The first battery 11 has a high output power tolerance and is therefore able to output a high current in response to the requirement from the drive motor-generator 13. On the other hand, the first battery 11 has a lower capacity than the second battery 12. In this embodiment, when the output power value required by the drive motor-generator 13 is low, the first battery 11 does not supply electric power to the drive motor-generator 13. This enables the first battery 11 to preserve the electric power stored in the first battery 11. Thus, the electric power stored in the first battery 11 is not wasted. As a result, when the output power value required by the drive motor-generator 13 is high, the requirement is easily met by supplying electric power from the first battery 11.

Thus, in this embodiment, the vehicle driving system 10 includes the first battery 11, which is a high power battery, and the second battery 12, which is a high capacity battery. When it is unnecessary to perform charging and discharging at high currents, electric power stored in the first battery 11 is preserved. When it is necessary to perform charging and discharging at high currents, the first battery 11 is used preferentially. Moreover, the system is configured so that the regenerative power produced by the drive motor-generator 13 is charged preferentially into the first battery 11. This enables the batteries to output high power appropriately according to the requirement from the drive motor-generator 13.

In this embodiment, the controller 15 is configured to cause the first battery 11 to be charged from the second battery 12 (i.e., to perform Charge V) when both the first battery 11 and the second battery 12 are disconnected from the drive motor-generator 13 and the state of charge of the first battery 11 is lower than a predetermined SOC. In this case, in the embodiment shown in FIG. 1, the controller 15 may cause the relay r1 to be turned ON and cause the relay r2, the relay r5, and the relay r3 to be turned OFF. This enables the first battery 11 and the second battery 12 to be connected to each other. Then, the control unit c1 may adjust the voltage between the first battery 11 and the second battery 12 so that current can flow from the first battery 11 to the second battery 12.

The configuration described above enables charging from the second battery 12 to the first battery 11 to take place appropriately. Thus, when both the first battery 11 and the second battery 12 are disconnected from the drive motor-generator 13, electric power is supplied from the second battery 12 to the first battery 11, and the state of charge of the first battery 11 is recovered to a predetermined SOC. This increases the likelihood that the first battery 11, which is a high power battery, is able to supply electric power to the drive motor-generator 13 when the output power value required by the drive motor-generator 13 is high. This increases the rate at which the drive motor-generator 13 is able to produce the required output power, improving the driving performance of the vehicle. The vehicle driving system 10 may be configured to stop the control operation of supplying electric power from the second battery 12 to the first battery 11 at the time when, for example, the first battery 11 reaches a predetermined SOC. This prevents electric power from being supplied excessively from the second battery 12 to the first battery 11.

Furthermore, in this embodiment, the controller 15 is configured to cause the second battery 12 to be charged from the first battery 11 (i.e., to perform Charge VI) when both the first battery 11 and the second battery 12 are disconnected from the drive motor-generator 13 and the state of charge of the first battery 11 is higher than a predetermined SOC. In this case, in the embodiment shown in FIG. 1, the controller 15 may cause the relay r1 to be turned ON and cause the relays r2 and r5 to be turned OFF. This enables the first battery 11 and the second battery 12 to be connected to each other. Then, the control unit c1 may adjust the voltage between the first battery 11 and the second battery 12 so that current can flow from the second battery 12 to the first battery.

For example, there may be cases where the regenerative power produced by the drive motor-generator 13 is charged into the first battery 11 and consequently the state of charge of the first battery 11 becomes higher than a predetermined SOC. In such cases, the first battery 11 charges the second battery 12 until the first battery 11 reaches to the predetermined SOC in this embodiment. As a result, the state of charge of the first battery 11 is reduced. Moreover, when regenerative power is produced by the drive motor-generator 13, the regenerative power is charged into the first battery 11. Therefore, the recovery efficiency of the regenerative power increases. It should be noted that the vehicle driving system 10 may be configured to stop the control operation of supplying electric power from the first battery 11 to the second battery 12 at the time when, for example, the first battery 11 reaches a predetermined SOC. This prevents electric power from being supplied excessively from the first battery 11 to the second battery 12 and allows the first battery 11 to be kept at a high state of charge.

The first battery 11 may be lighter in weight and smaller in size than the second battery 12. In addition, the first battery 11 may be configured to be lower in cost than the second battery 12. In this embodiment, the frequency of use of the first battery 11 is higher, as described above. Furthermore, the first battery 11 undergoes repeated charging and discharging at high currents. Consequently, although the first battery 11 is composed of a battery that does not easily deteriorate against charging and discharging at high currents, the performance deterioration is likely to occur gradually.

On the other hand, this vehicle driving system 10 includes the first battery 11, which is a high power battery, so the use of the second battery 12, which is a high capacity battery, at high rates (i.e., at high current values) is reduced. For this reason, the second battery 12 may have much longer lifetime than the first battery 11. The first battery 11 results in a higher frequency of replacement than the second battery 12, but the first battery 11 is configured to be lower in cost than the second battery 12. As a result, the long-term maintenance cost of the vehicle driving system 10 as a whole can be reduced. In this vehicle driving system 10, the first battery 11 is considered as a consumable part that lasts only for a shorter span of time than the second battery 12. Because the first battery 11 is lighter in weight and smaller in size than the second battery 12, handling is made easier, and the work load in replacing the battery is reduced.

Moreover, this vehicle driving system 10 includes the first battery 11 and the second battery 12. The first battery 11 and the second battery 12 are each connected to the drive motor-generator 13 and the power receiving unit 14. Therefore, even if one of the batteries fails, the vehicle does not immediately become undrivable. In particular, even when the first battery 11 fails, it is possible to supply electric power to the drive motor-generator 13 and a long distance travel is also possible, as long as the second battery 12, which is a high capacity battery, does not fail. Therefore, this vehicle driving system 10 is able to provide a system, as a whole, that is less likely to become undrivable due to battery troubles.

The vehicle driving system 10 as disclosed herein may be suitably applied to a driving system for what is called electric vehicles. Examples of the vehicles to which the vehicle driving system 10 disclosed herein is suitably applied include not only electric cars but also small-sized vehicles, such as electric scooters, electric motorcycles, electric kick scooters, and electric unicycles. The vehicle driving system 10 may also be applicable to large-sized vehicles, such as electric buses. For a specific exemplary configuration of a vehicle to which the vehicle driving system 10 can be applied, the drive motor-generator 13 may be mechanically connected to a drive-train of the vehicle. Such a specific configuration of the vehicle is not limited to any specific example, as various types of embodiments of electric vehicles have been proposed.

Various embodiments of the vehicle driving system have been described hereinabove according to the present disclosure. Unless specifically stated otherwise, the embodiments of the vehicle driving system described herein do not limit the scope of the present invention. It should be noted that various other modifications and alterations may be possible in the embodiments of the vehicle driving system disclosed herein. In addition, the features, structures, or steps described herein may be omitted as appropriate, or may be combined in any suitable combinations, unless specifically stated otherwise.

The invention claimed is:
1. A vehicle driving system comprising:
a first battery;
a second battery;
a drive motor-generator connected to the first battery and the second battery via respective relays;
a power receiving unit connected to the first battery and the second battery via respective relays and also connected to an external power supply,
wherein
the first battery is configured to be charged and discharged at a current rate of higher than or equal to 5 C;
the second battery has a higher capacity than the first battery; and
a controller configured to:
when the power receiving unit is connected to the external power supply, cause the first battery to be charged if the state of charge of the first battery is lower than a predetermined SOC, and
cause the second battery to be charged if the state of charge of the first battery is higher than or equal to the predetermined SOC; and
when regenerative power is output from the drive motor-generator,
cause the regenerative power to be input to the first battery if the state of charge of the first battery is lower than a predetermined SOC, and
cause the regenerative power to be input to the second battery if the state of charge of the first battery is higher than or equal to the predetermined SOC.

2. The vehicle driving system according to claim 1, wherein the controller is configured to cause a charging current value to be higher when the first battery is charged from the power receiving unit than when the second battery is charged from the power receiving unit.

3. The vehicle driving system according to claim 1, wherein:
the controller is configured to:
cause the drive motor-generator to be connected to the first battery when an output power value required by the drive motor-generator is higher than or equal to a predetermined output power value and the state of charge of the first battery is higher than or equal to a predetermined SOC; and
cause the drive motor-generator to be connected to the second battery when the output power value required by the drive motor-generator is higher than or equal to the predetermined output power value and the state of charge of the first battery is lower than the predetermined SOC.

4. The vehicle driving system according to claim 1, wherein:
the controller is configured to:
cause the drive motor-generator to be connected to the second battery when an output power value required by the drive motor-generator is lower than a predetermined output power value and the state of charge of the second battery is higher than or equal to a predetermined SOC; and
cause the drive motor-generator to be connected to the first battery when the output power value required by the drive motor-generator is lower than the predetermined output power value and the state of charge of the second battery is lower than the predetermined SOC.

5. The vehicle driving system according to claim 1, wherein the controller is configured to cause the first battery to be charged from the second battery when both the first battery and the second battery are disconnected from the drive motor-generator and the state of charge of the first battery is lower than a predetermined SOC.

6. The vehicle driving system according to claim 1, wherein the controller is configured to cause the second battery to be charged from the first battery when both the first battery and the second battery are disconnected from the drive motor-generator and the state of charge of the first battery is higher than a predetermined SOC.

7. The vehicle driving system according to claim 1, wherein the first battery is lighter in weight and smaller in size than the second battery.

8. A vehicle comprising the vehicle driving system according to claim 1.

9. A vehicle driving system comprising:
a first battery;
a second battery;
a drive motor-generator connected to the first battery and the second battery via respective relays;
a power receiving unit connected to the first battery and the second battery via respective relays and also connected to an external power supply,
wherein
the first battery is configured to be charged and discharged at a current rate of higher than or equal to 5 C;
the second battery has a higher capacity than the first battery; and
a controller configured to:
cause the drive motor-generator to be connected to the first battery when an output power value required by the drive motor-generator is higher than or equal to a predetermined output power value and the state of charge of the first battery is higher than or equal to a predetermined SOC; and
cause the drive motor-generator to be connected to the second battery when the output power value required by the drive motor-generator is higher than or equal to the predetermined output power value and the state of charge of the first battery is lower than the predetermined SOC.

10. The vehicle driving system according to claim 9, wherein the controller is configured to cause a charging current value to be higher when the first battery is charged from the power receiving unit than when the second battery is charged from the power receiving unit.

11. The vehicle driving system according to claim 9, wherein the first battery is lighter in weight and smaller in size than the second battery.

12. The vehicle driving system according to claim 9, wherein the controller is configured to cause the first battery to be charged from the second battery when both the first battery and the second battery are disconnected from the drive motor-generator and the state of charge of the first battery is lower than a predetermined SOC.

13. The vehicle driving system according to claim 9, wherein the controller is configured to cause the second battery to be charged from the first battery when both the first battery and the second battery are disconnected from the drive motor-generator and the state of charge of the first battery is higher than a predetermined SOC.

14. A vehicle driving system comprising:
a first battery;
a second battery;
a drive motor-generator connected to the first battery and the second battery via respective relays;
a power receiving unit connected to the first battery and the second battery via respective relays and also connected to an external power supply,
wherein
the first battery is configured to be charged and discharged at a current rate of higher than or equal to 5 C;
the second battery has a higher capacity than the first battery; and
a controller configured to:
cause the drive motor-generator to be connected to the second battery when an output power value required by the drive motor-generator is lower than a predetermined output power value and the state of charge of the second battery is higher than or equal to a predetermined SOC; and cause the drive motor-generator to be connected to the first battery when the output power value required by the drive motor-generator is lower than the predetermined output power value and the state of charge of the second battery is lower than the predetermined SOC.

15. The vehicle driving system according to claim 14, wherein the controller is configured to cause a charging current value to be higher when the first battery is charged from the power receiving unit than when the second battery is charged from the power receiving unit.

16. The vehicle driving system according to claim 14, wherein the first battery is lighter in weight and smaller in size than the second battery.

17. A vehicle driving system comprising:

a first battery;

a second battery;

a drive motor-generator connected to the first battery and the second battery via respective relays;

a power receiving unit connected to the first battery and the second battery via respective relays and also connected to an external power supply, wherein
the first battery is configured to be charged and discharged at a current rate of higher than or equal to 5 C;
the second battery has a higher capacity than the first battery; and
a controller configured to:
when the power receiving unit is connected to the external power supply,
cause the first battery to be charged if the state of charge of the first battery is lower than a predetermined SOC, and
cause the second battery to be charged if the state of charge of the first battery is higher than or equal to the predetermined SOC; and
cause the first battery to be charged from the second battery when both the first battery and the second battery are disconnected from the drive motor-generator and the state of charge of the first battery is lower than a predetermined SOC.

18. The vehicle driving system according to claim 17, wherein the controller is configured to cause a charging current value to be higher when the first battery is charged from the power receiving unit than when the second battery is charged from the power receiving unit.

19. The vehicle driving system according to claim 17, wherein the first battery is lighter in weight and smaller in size than the second battery.

* * * * *